United States Patent
Chen (10) Patent No.: US 10,674,827 B2
(45) Date of Patent: Jun. 9, 2020

(54) DISPLACEMENT AUXILIARY DEVICE FOR ACCESSORY OF CHAIR

(71) Applicant: ATEC INTERNATIONAL TEAM CO., LTD., Taoyuan (TW)

(72) Inventor: Te-Chun Chen, Taoyuan (TW)

(73) Assignee: ATEC INTERNATIONAL TEAM CO., LTD., Luzhu Dist., Taoyuan (TW)

( * ) Notice: Subject to any disclaimer, the term of this patent is extended or adjusted under 35 U.S.C. 154(b) by 86 days.

(21) Appl. No.: 16/190,575

(22) Filed: Nov. 14, 2018

(65) Prior Publication Data

US 2020/0146453 A1    May 14, 2020

(51) Int. Cl.
| | | |
|---|---|---|
| *A47C 7/46* | (2006.01) | |
| *F16H 19/04* | (2006.01) | |
| *A47C 7/38* | (2006.01) | |
| *A47C 7/54* | (2006.01) | |

(52) U.S. Cl.
CPC .............. *A47C 7/462* (2013.01); *A47C 7/38* (2013.01); *A47C 7/541* (2018.08); *F16H 19/04* (2013.01)

(58) Field of Classification Search
CPC .. A47C 1/03; A47C 7/462; A47C 7/46; A47C 7/40; A47C 7/541; A47C 7/54; A47C 7/543; A47C 7/38; F16H 19/04; F16H 19/02
USPC ............. 297/284.7, 115, 116, 227, 281, 282, 297/284.3, 411.2, 411.32
See application file for complete search history.

(56) References Cited

U.S. PATENT DOCUMENTS

| | | | | |
|---|---|---|---|---|
| 7,234,779 B2* | 6/2007 | Bedford | ................. | A47C 1/03 297/344.16 |
| 7,387,341 B1* | 6/2008 | Tsai | ................. | A47C 1/03 297/411.35 |
| 8,622,477 B2* | 1/2014 | Colasanti | ................. | A47C 7/54 297/411.35 |
| 9,320,360 B2* | 4/2016 | Bauer | ................. | A47C 1/03 |
| 9,592,757 B2* | 3/2017 | Machael | ................. | A47C 1/03 |
| 9,901,175 B2 | 2/2018 | Chen | | |
| 10,455,946 B1* | 10/2019 | Wang | ................. | A47C 7/462 |
| 2003/0030317 A1* | 2/2003 | Chen | ................. | A47C 1/03 297/411.35 |
| 2005/0146192 A1* | 7/2005 | Trego | ................. | A47C 1/03 297/411.37 |
| 2008/0073965 A1* | 3/2008 | Tsai | ................. | A47C 1/03 297/411.36 |

(Continued)

*Primary Examiner* — Mark R Wendell
(74) *Attorney, Agent, or Firm* — Muncy, Geissler, Olds & Lowe, P.C.

(57) ABSTRACT

A displacement auxiliary device for an accessory of a chair is revealed. The auxiliary device is disposed on the chair and used in combination with the accessory of the chair such as an armrest, a lumbar support, a headrest, etc. The auxiliary device includes a displacement member, a fixing plate and a loading plate. The displacement member further includes two rotating members that are rotated a large angle around two rotary shafts respectively and symmetrically to be moved inward to a first position or extended outward to a second position. The accessory of the chair stays still without displacement when the two rotating members are moved inward to the first position. The accessory of the chair moves synchronously while the two rotating members are extended outward to the second position. Thereby the accessory of the chair can be adjusted to have larger displacement.

7 Claims, 11 Drawing Sheets

(56) References Cited

U.S. PATENT DOCUMENTS

| | | | |
|---|---|---|---|
| 2009/0302661 A1* | 12/2009 | Melhuish | A47C 1/03 297/411.35 |
| 2011/0181090 A1* | 7/2011 | Chen | A47C 1/03 297/411.37 |
| 2012/0175934 A1* | 7/2012 | Bock | A47C 1/03 297/411.37 |
| 2014/0077568 A1* | 3/2014 | Hu | A47C 7/54 297/411.38 |
| 2014/0145490 A1* | 5/2014 | Chen | A47C 1/03 297/411.37 |
| 2018/0103765 A1 | 4/2018 | Chen | |

* cited by examiner

DISPLACEMENT AUXILIARY DEVICE FOR ACCESSORY OF CHAIR

BACKGROUND OF THE INVENTION

Field of the Invention

The present invention relates to a displacement auxiliary device, especially to a displacement auxiliary device disposed on a chair and used in combination with an accessory of the chair such as an armrest, a lumbar support, a headrest, etc. so that the accessory not only can be adjusted but also achieves larger displacement.

Description of Related Art

The chair such as office chair is always provided with various accessories such as armrest, headrest or lumbar support according to users' needs. Most of the above accessories are provided with various auxiliary devices for displacement so that users can adjust or move the accessories for ergonomics and comfort. In the field related to the chair accessories, a plurality of prior arts is available such as U.S. Pat. No. 9,901,175, US Pat. App. Pub. No. 2018/0103765A1, and so on. However, the conventional technique related to displacement of the chair accessories is only design for one specific accessory and unable to be applied to others. For example, the technique for displacement of the armrest is unable to be applied to the headrest easily. Thereby the production cost for chair accessories is increased. Moreover, the displacement of the chair accessory is often limited owing to the design of the mechanism so that the efficiency of the displacement/adjustment mechanism is reduced. Thus there is room for improvement and there is a need to provide a novel displacement mechanism for chair accessories.

SUMMARY OF THE INVENTION

Therefore it is a primary object of the present invention to provide a displacement auxiliary device for accessories of a chair in which two rotating members are rotated a large angle around two rotary shafts respectively and synchronously to be moved inward to a first position or extended outward to a second position. The chair accessory stays at the original position and there is no displacement when the two rotating members are moved inward to the first position. The chair accessory moves synchronously while the two rotating members are extended outward to the second position. Thereby the auxiliary device can be applied to various accessories of the chair and the accessories of the chair can be adjusted to have larger displacement.

In order to achieve the above object, a displacement auxiliary device for accessories of a chair according to the present invention includes a displacement member, a fixing plate and a loading plate. The displacement member consists of a bottom plate, two laterally symmetrical rotary shafts, two laterally symmetrical fixing shafts, two laterally symmetrical fasteners, two laterally symmetrical rotating members that rotate synchronously, a stopping wall and two laterally symmetrical first locked parts. The two rotary shafts and the two fixing shafts are fixed on the bottom plate. Each of the rotating members is composed of a pivot hole, a penetrating slide slot, a curved first slide, and a curved toothed part. The pivot hole is mounted on the rotary shaft correspondingly so that the rotating members can rotate around the rotary shafts respectively and toward each other. The fastener is inserted into the slide slot and sliding in the slide slot. The first slide is mounted on the fixing shaft to slide around the fixing shaft. The toothed parts of the rotating members mesh with each other so that the two rotating members can rotate around the rotary shafts synchronously and symmetrically to be moved inward to a first position and extended outward to a second position. The stopping wall is used for stopping the two rotating members at the first position. The fixing plate is placed over the displacement member. Two laterally symmetrical indentations are arranged at the fixing plate while a bottom surface of the fixing plate is provided with two laterally symmetrical first locking parts and two laterally symmetrical second locking parts. The two slide slots on the rotating members of the displacement member are protruding from the indentations to be exposed. The first locking parts are locked into the rotary shafts of the displacement member while the second locking parts are mounted into the first locked parts of the displacement member.

Thereby the two fasteners and the two rotating members are movably held between the bottom plate and the fixing plate. The loading plate is movably disposed over the fixing plate and including two laterally symmetrical second locked parts and one accessory fixing part used for fixing the accessory of the chair. The two second locked parts are inserted into the slide slots of the rotating members respectively to be connected to and fixed by the respective fastener in the slide slot. The accessory of the chair remains still when the two rotating members are rotated synchronously and symmetrically for being moved inward to the first position. The accessory of the chair are moved along with the synchronous and symmetrical rotation of the two rotating member when the two rotating member are rotated synchronously and symmetrically for extended outward to the second position.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
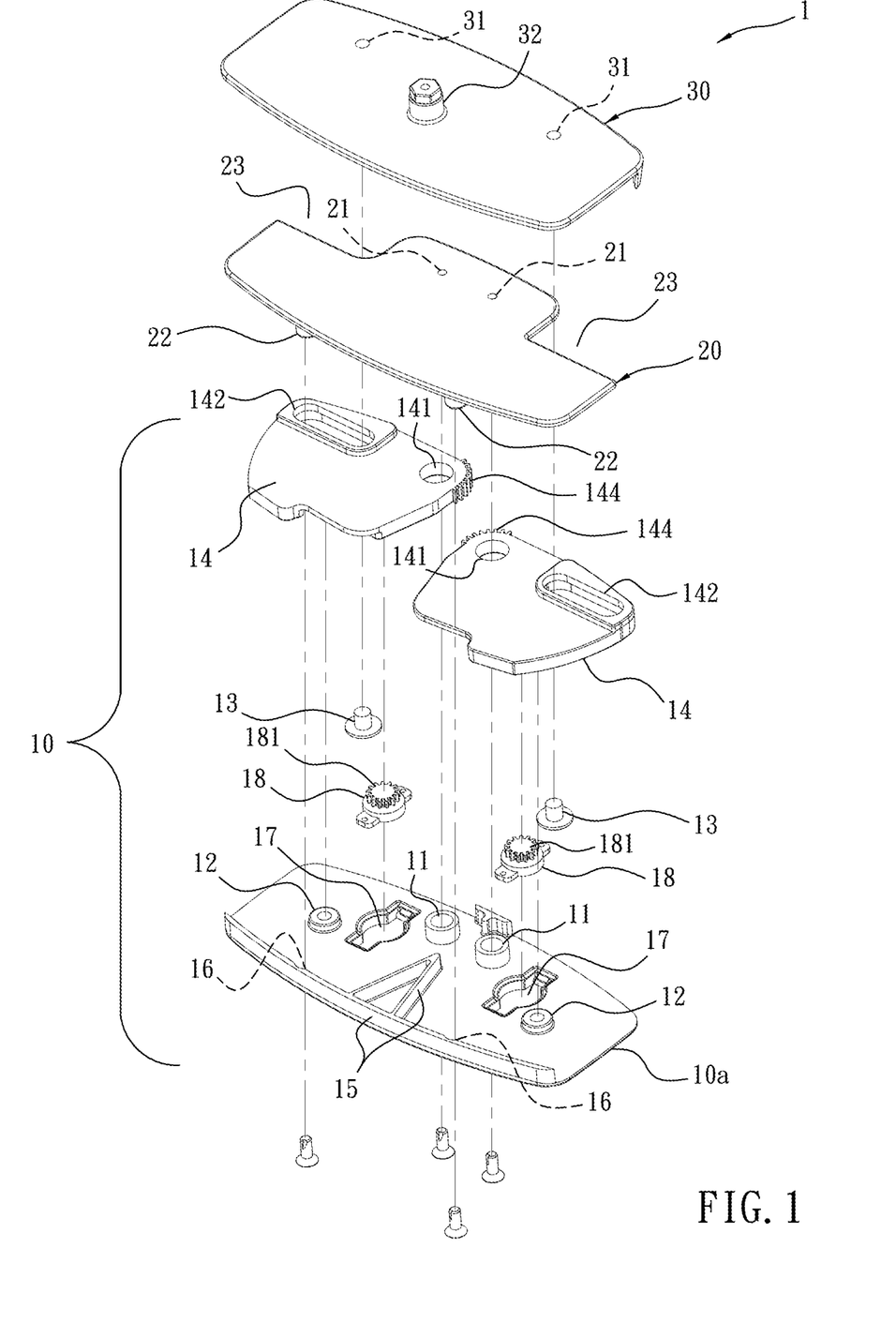
FIG. 1 is an explosive view of an embodiment according to the present invention.
Figure 9:
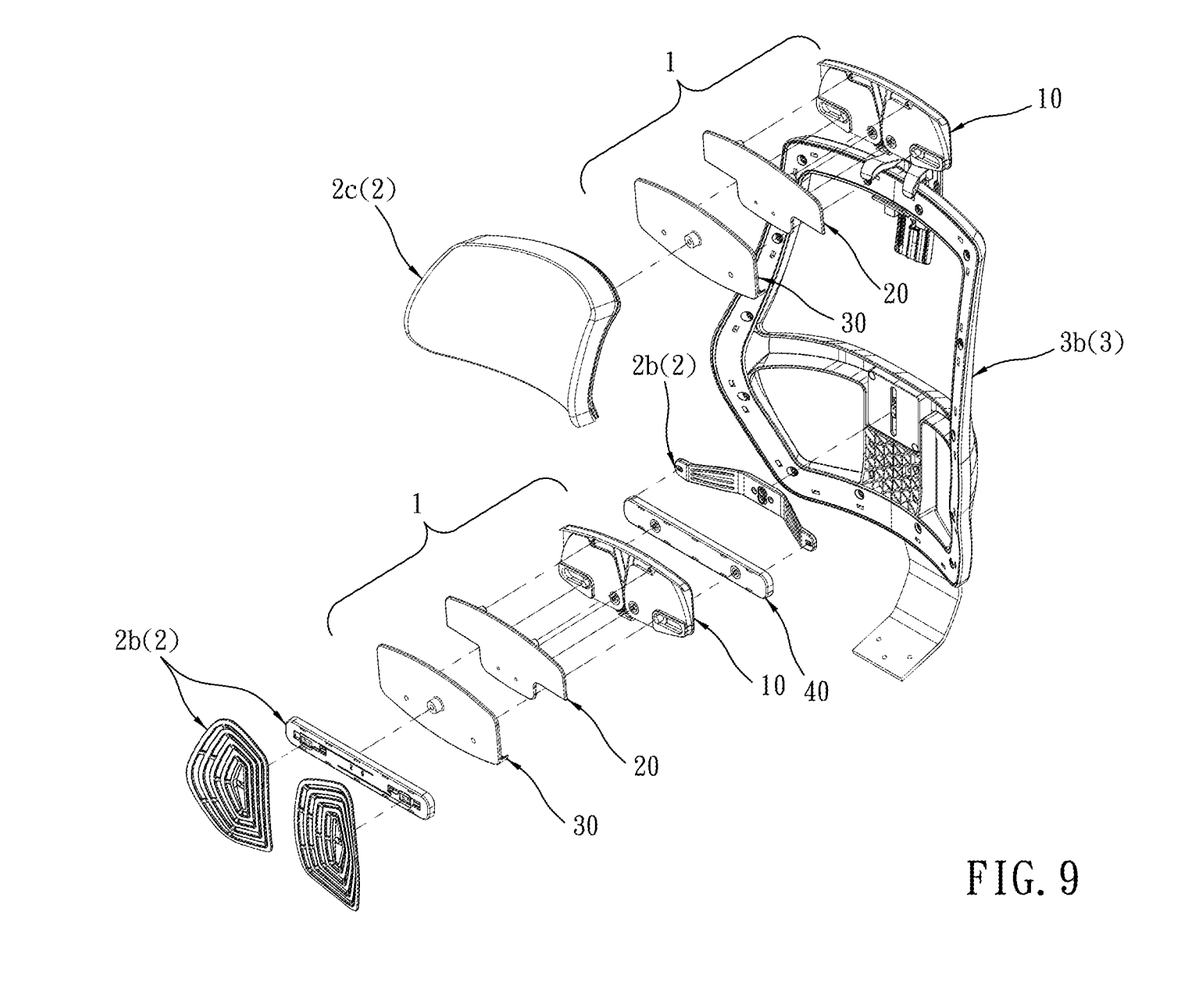
FIG. 9 is an explosive view of an embodiment applied to a lumbar support and a headrest according to the present invention.
Figure 10:
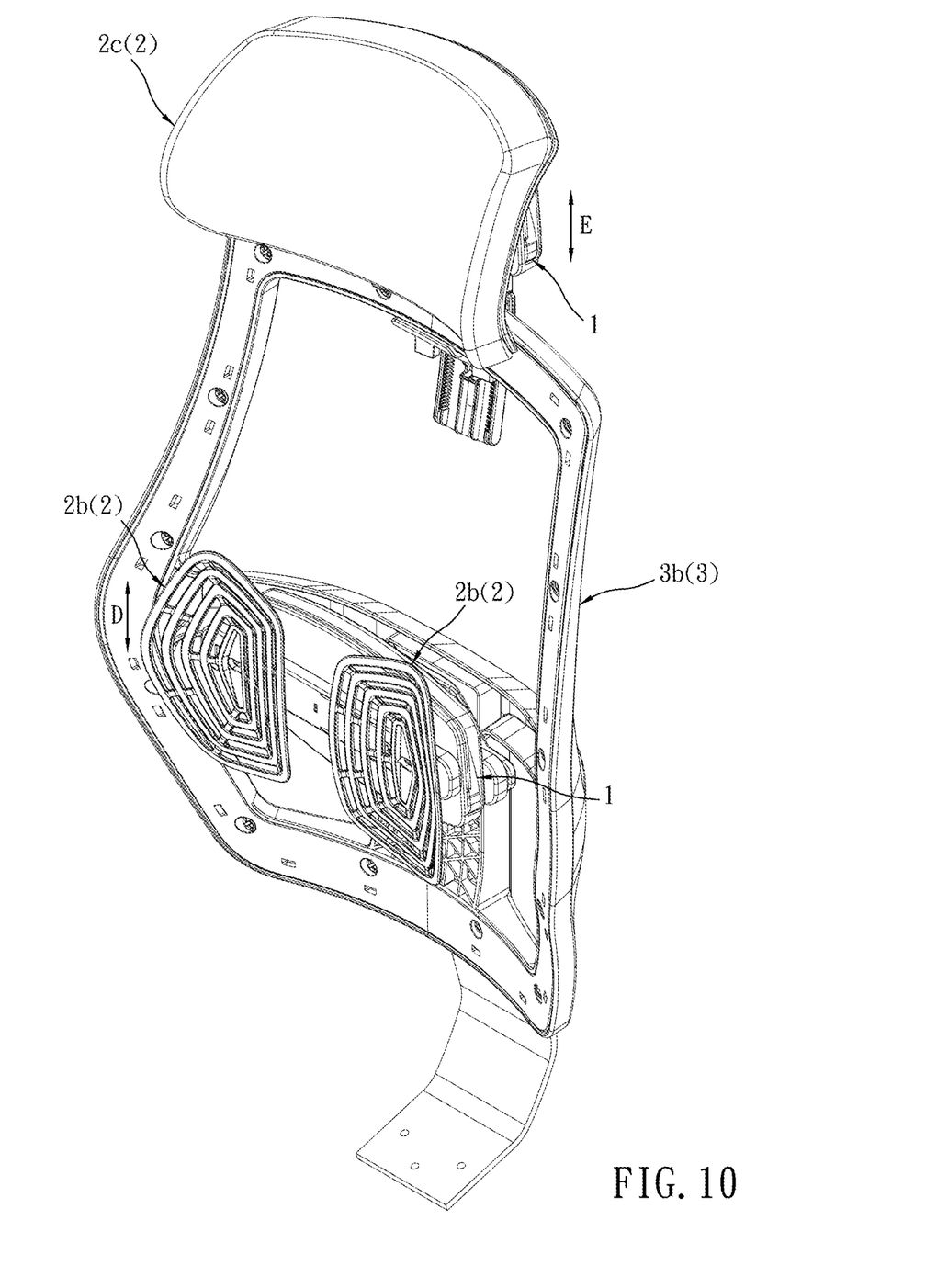
FIG. 10 is a perspective view of the embodiment in FIG. 9 according to the present invention.

Refer to FIG. 1, a displacement auxiliary device 1 for an accessory 2 of a chair 3 according to the present invention includes a displacement member 10, a fixing plate 20 and a loading plate 30. The displacement auxiliary device 1 is disposed on the chair 3 and used in conjunction with the accessory 2 such as armrests (as shown in FIG. 3 and FIG. 4), a lumbar support or a headrest (as shown in FIG. 9 and FIG. 10).

Figure 2:
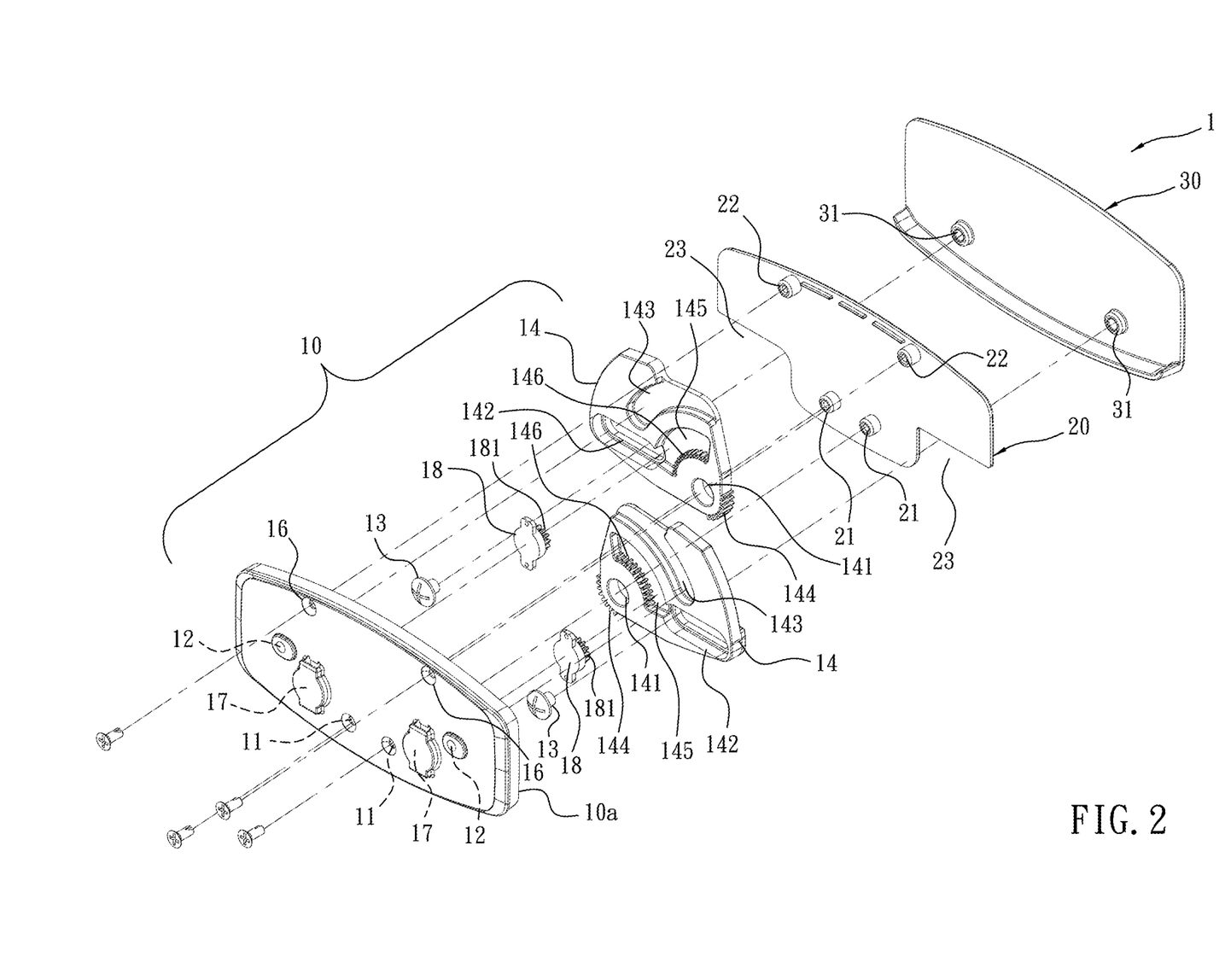
FIG. 2 is an explosive view of the embodiment in FIG. 1 viewed from another angle according to the present invention.
Figure 3:
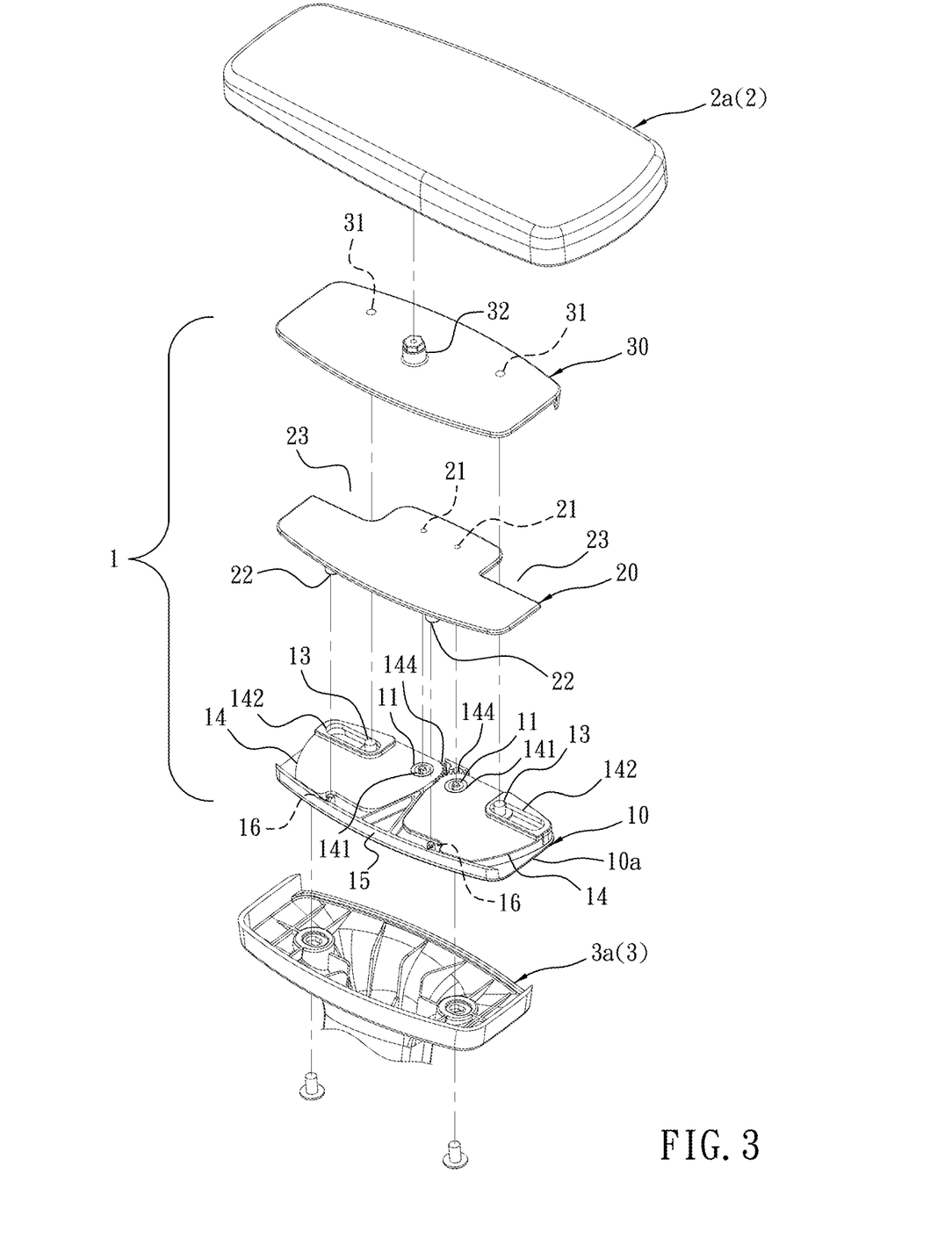
FIG. 3 is an explosive view of an embodiment applied to an armrest according to the present invention.
Figure 4:
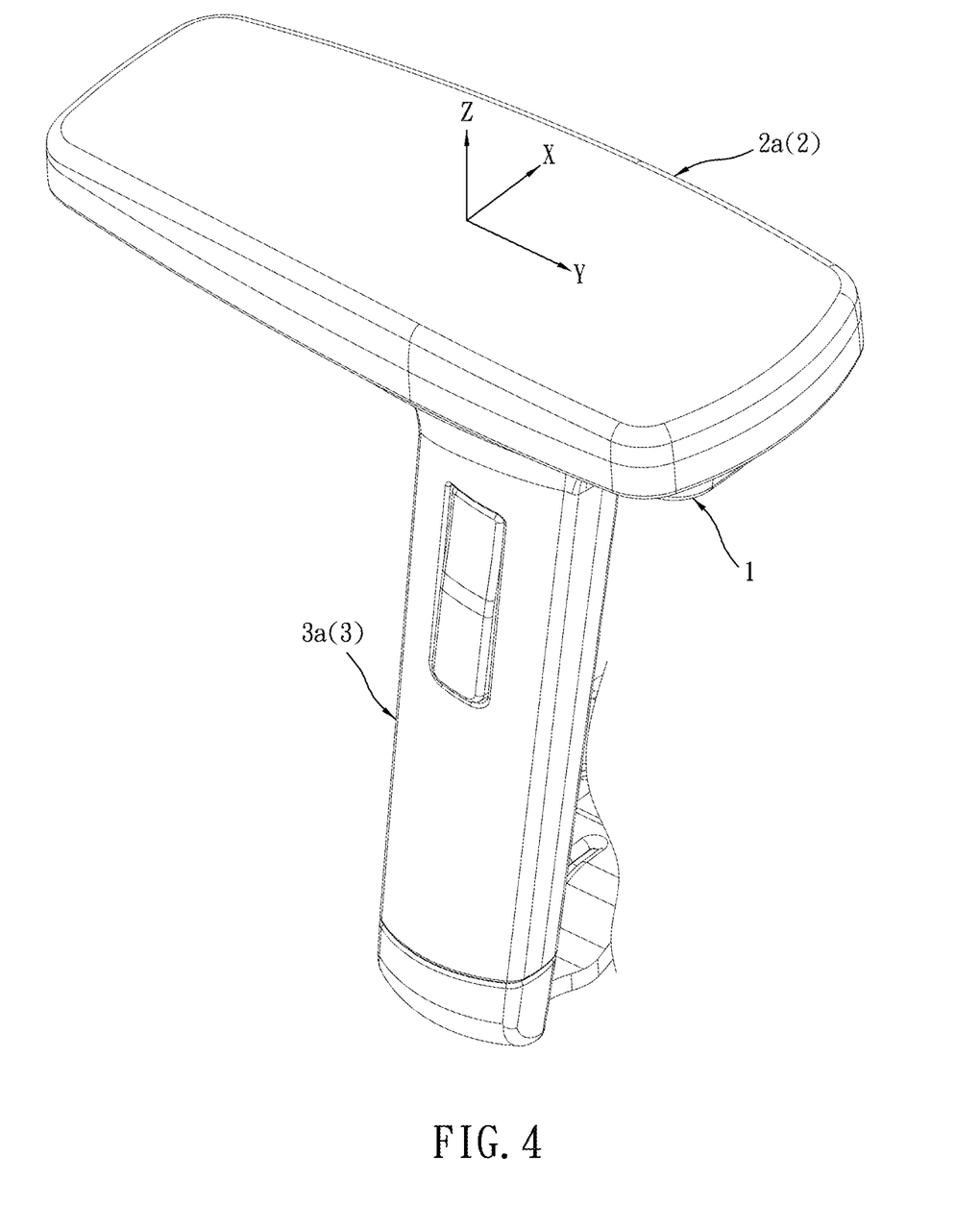
FIG. 4 is a perspective view of the embodiment in FIG. 3 in use according to the present invention.
Figure 5:
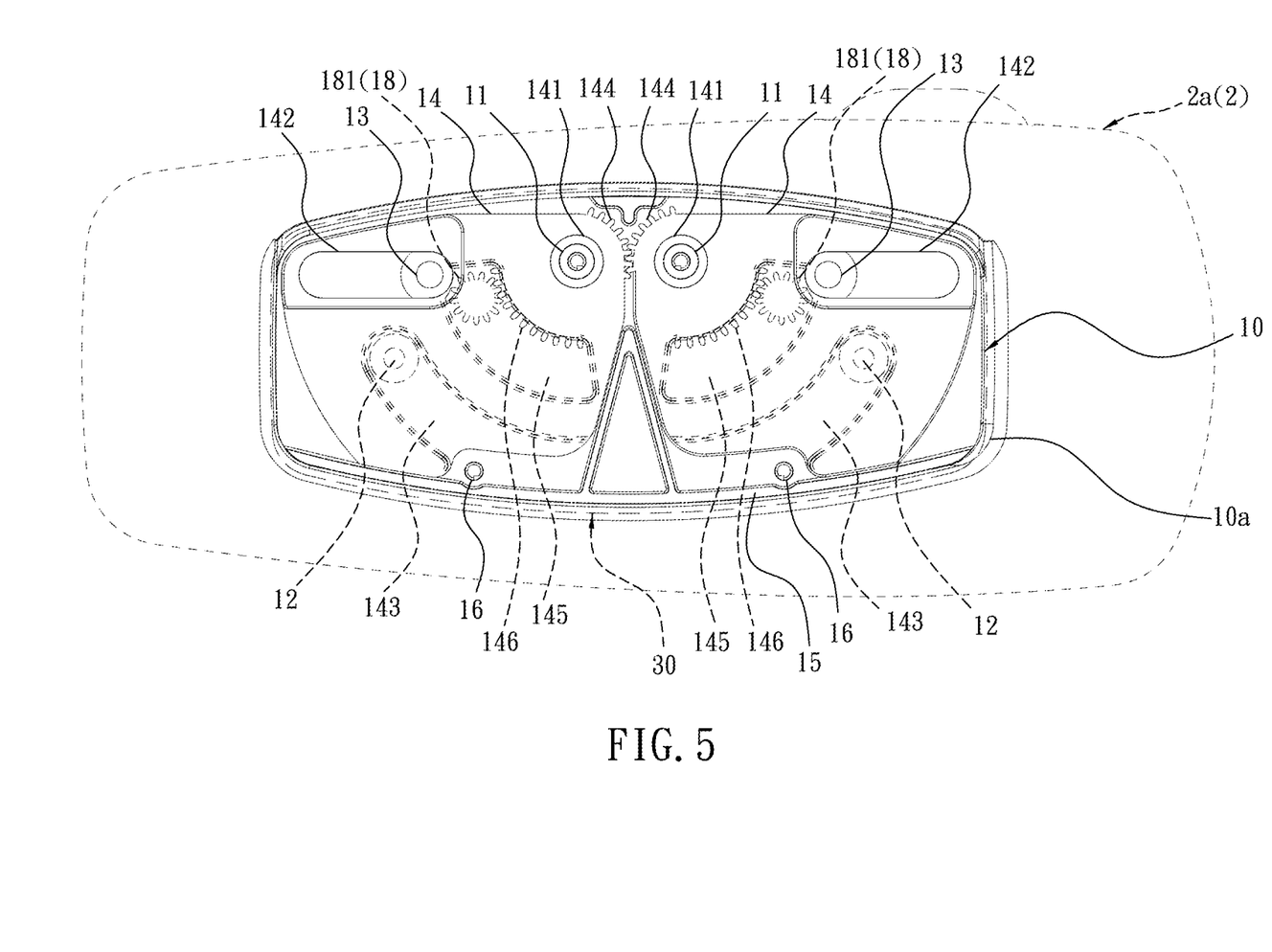
FIG. 5 is a schematic drawing showing a top view of the embodiment in FIG. 3 when two rotating members are moved to a first position according to the present invention.
Figure 6:
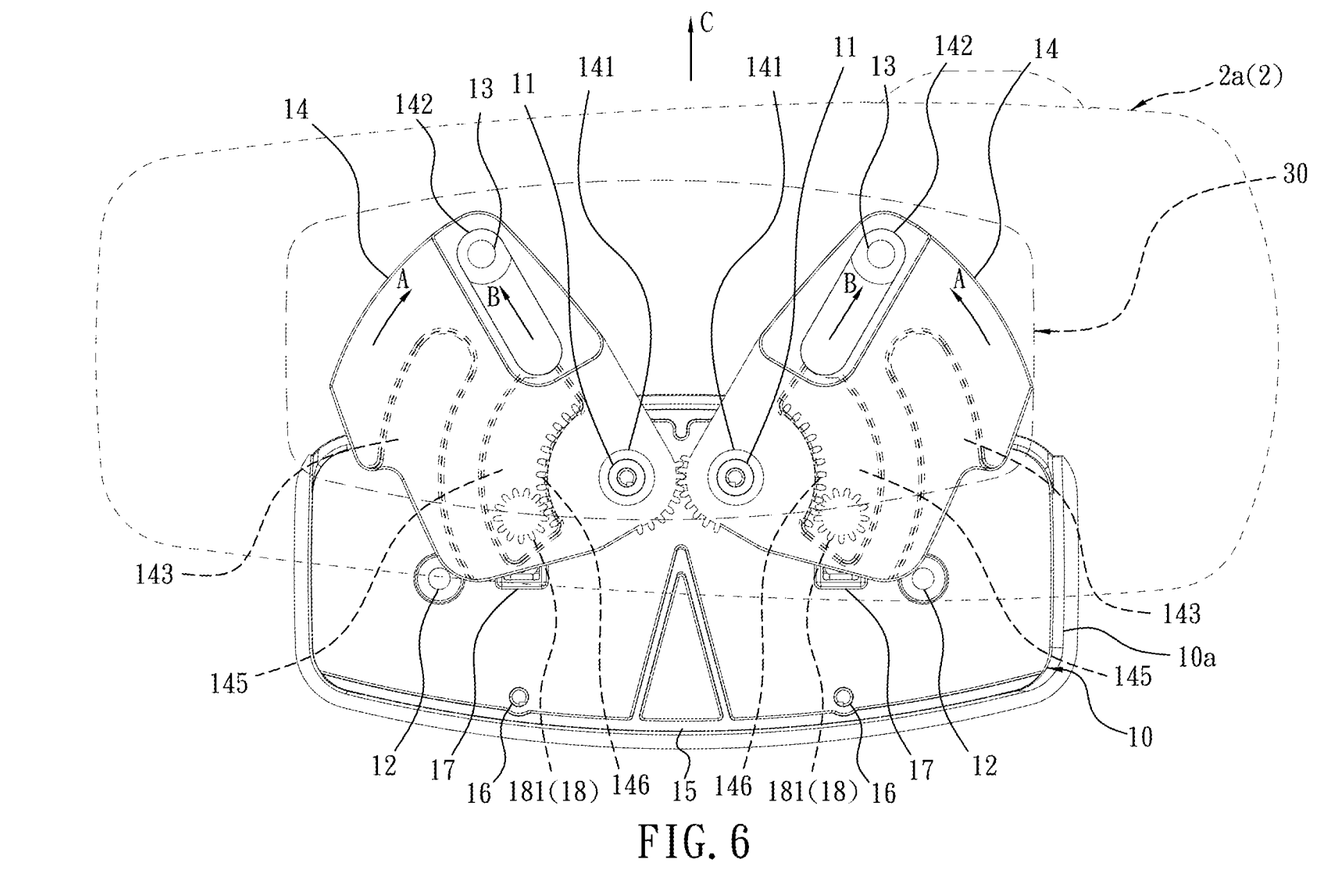
FIG. 6 is a schematic drawing showing a top view of the embodiment in FIG. 3 when two rotating members are extended to a second position according to the present invention.
Figure 11:
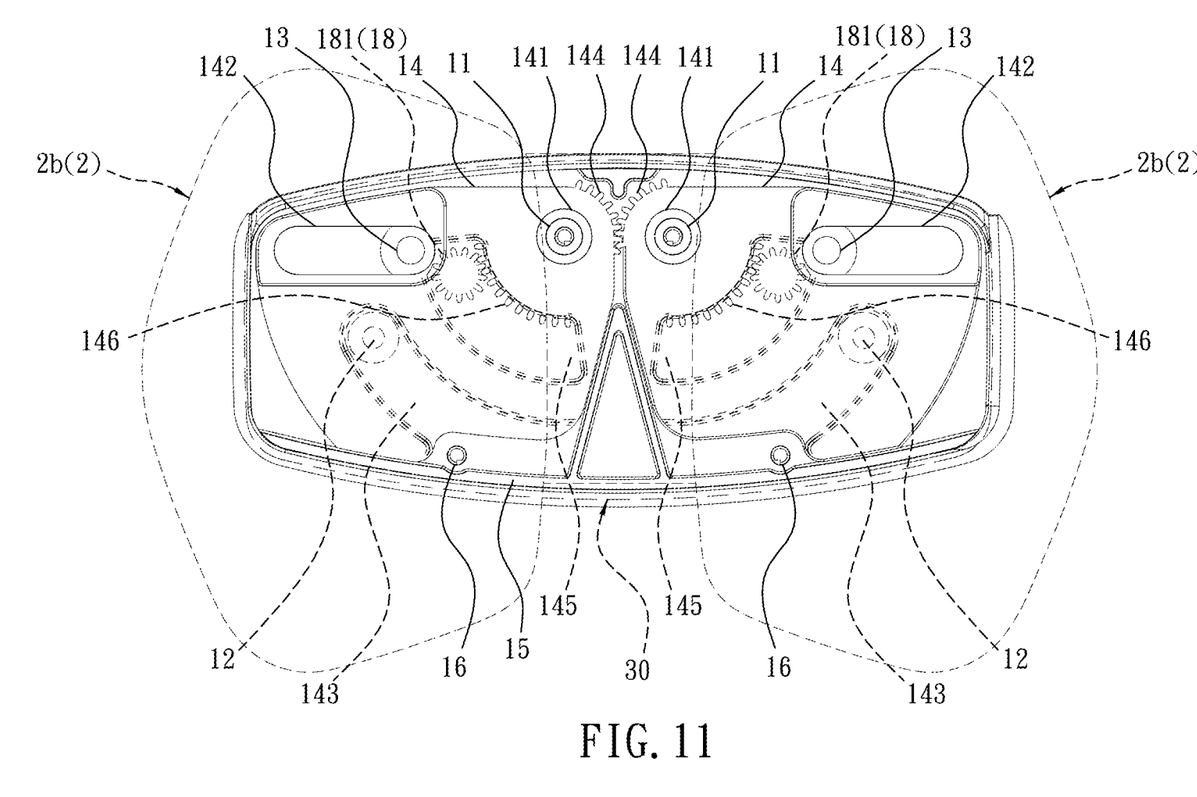
FIG. 11 is a schematic drawing showing a top view of the embodiment in FIG. 10 when two rotating members are moved to a first position according to the present invention.
Figure 12:
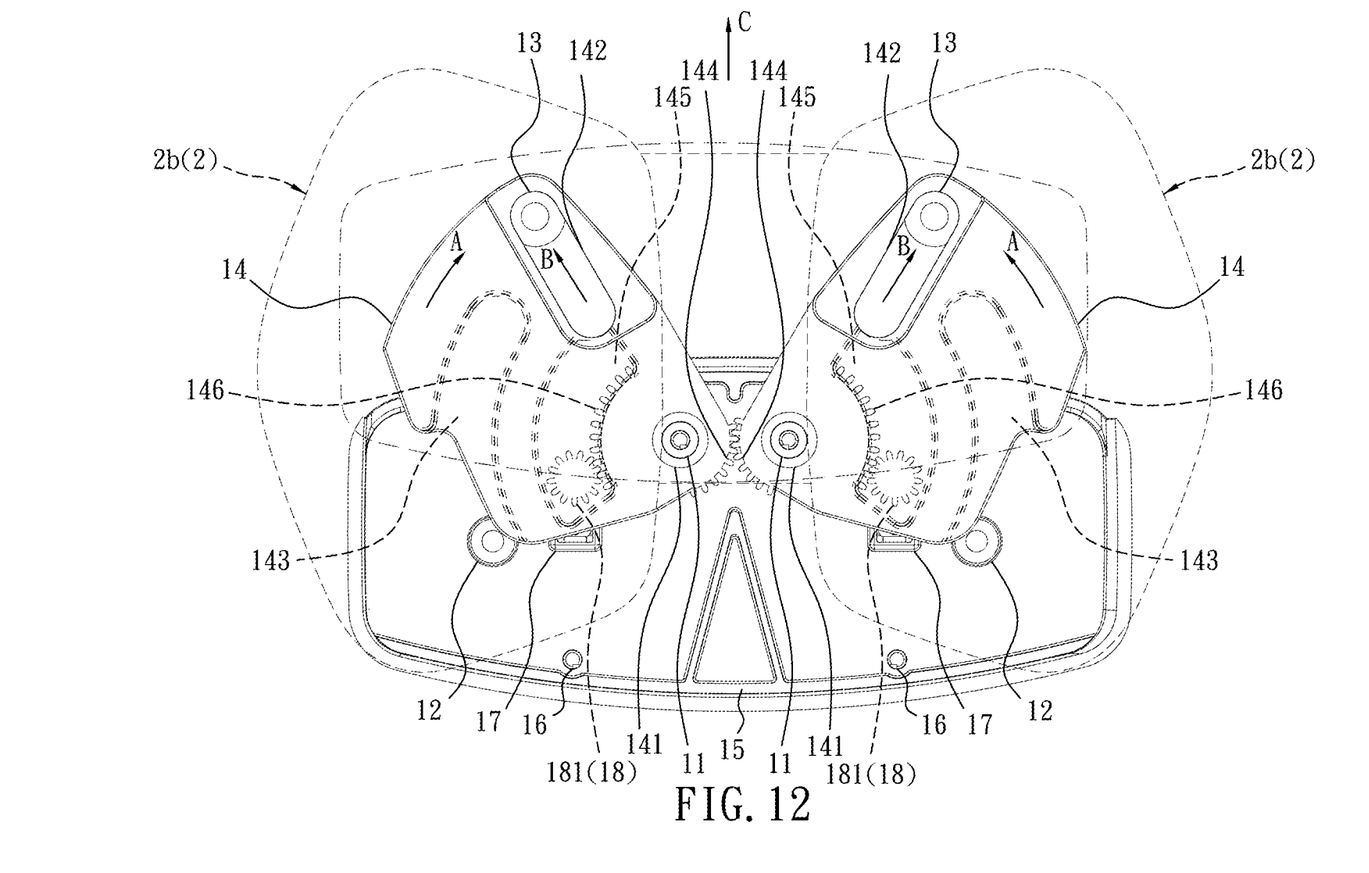
FIG. 12 is a schematic drawing showing a top view of the embodiment in FIG. 10 when two rotating members are extended to a second position according to the present invention.

Refer to FIG. 1, FIG. 2 and FIG. 3, the displacement member 10 consists of a bottom plate 10a, two laterally symmetrical rotary shafts 11, two laterally symmetrical fixing shafts 12, two laterally symmetrical fasteners 13, two laterally symmetrical rotating members 14 that rotate synchronously, a stopping wall 15 and two laterally symmetrical first locked parts 16. The two rotary shafts 11, the two fixing shafts 12, and the two first locked parts 16 are fixed on the bottom plate 10a respectively. As to the rotating members 14, it is composed of a pivot hole 141, a penetrating slide slot 142, a curved first slide 143, and a curved toothed part 144. The pivot holes 141, the penetrating slide slots 142, the curved first slides 143, and the curved toothed parts 144 are arranged symmetrically. The pivot hole 141 is mounted on the rotary shaft 11 correspondingly so that the rotating members 14 can rotate around the rotary shafts 11 respectively and toward each other, as the arrows A in FIG. 6 and FIG. 12 indicate. The fastener 13 is inserted into the slide slot 142 for sliding therein, as the arrows B in FIG. 6 and FIG. 12 indicate. The first slide 143 is mounted on the fixing shaft 12 to slide around the fixing shaft 12. The toothed parts 144 of the rotating members 14 mesh with each other so that the two rotating members 14 can rotate around the rotary shafts 11 synchronously and symmetrically to move inward to a first position (as shown in FIG. 5 and FIG. 11) or extend outward to a second position (as shown in FIG. 6 and FIG. 12). The stopping wall 15 is used for stopping the two rotating members 14 at the first position (as shown in FIG. 5 and FIG. 11).

The fixing plate 20 is placed over the displacement member 10 and is composed of two laterally symmetrical first locking parts 21, two laterally symmetrical second locking parts 22, and two laterally symmetrical indentations 23. The indentations 23 are arranged at the fixing plate 20 while the first and the second locking parts 21, 22 are disposed on a bottom surface of the fixing plate 20. The slide slots 142 of the rotating members 14 are protruding from the indentations 23 to be exposed. The two first locking parts 21 are locked into the two rotary shafts 11 of the displacement member 10 respectively while the two second locking parts 22 are mounted into the two first locked parts 16 of the displacement member 10. Thereby the two fasteners 13 and the two rotating members 14 are movably held between the bottom plate 10a and the fixing plate 20.

The loading plate 30 is movably disposed over the fixing plate 20 and composed two laterally symmetrical second locked parts 31 and at least one accessory fixing part 32. The accessory fixing part 32 is used to fix the accessory 2 on the loading plate 30, as shown in FIG. 3 and FIG. 4. The two second locked parts 31 are inserted into the slide slots 142 of the rotating members 14 respectively to be connected to and fixed by the respective fastener 13 in the slide slot 142. Thus the loading plate 30 is moved outward synchronously to the second position (as shown in FIG. 6 and FIG. 12) or turned back synchronously to the first position (as shown in FIG. 5 and FIG. 11) along with the synchronous and symmetrical rotation of the two rotating members 14.

While in use, the accessory 2 is fixed on the loading plate 30 (as shown in FIG. 3 and FIG. 4) and the displacement auxiliary device 1 is arranged at the chair 3. At the moment, the bottom plate 10a and the fixing plate 20 stay still with respect to the chair 3, as shown in FIG. 5, FIG. 6, FIG. 11 and FIG. 12.

While in use, the loading plate 30 and the accessory 2 remain still on the loading plate 30 and having no displacement when the two rotating members 14 are rotated synchronously and symmetrically to be moved inward to the first position, as shown in FIG. 5 and FIG. 11.

When the rotating members 14 are rotated synchronously and symmetrically to be extended outward to the second position, the loading plate 30 and the accessory 2 are moved outward synchronously along with the synchronous and symmetrical rotation of the two rotating members 14 and a larger displacement occurs, as the arrows C in FIG. 6 and FIG. 12 indicate. Moreover, the two rotating members 14 can be rotated and adjusted between the first position (as shown in FIG. 5 and FIG. 11) and the second position (as shown in FIG. 6 and FIG. 12) to stay at a certain position between the first position and the second position freely, instead of only at the first position or the second position. That means the two rotating members 14 can be stopped not only at the two specific positions (the first and the second positions). Thereby the accessory 2 of the chair 3 can be adjusted freely within the range between the first position and the second position according to users' requirements.

Refer to FIG. 1 and FIG. 2, the displacement member 10 further includes two laterally symmetrical mounting slots 17 disposed on the right half and the left half thereof respectively. A curved second slide 145 with a curved rack 146 thereof is arranged at the rotating member 14 of the displacement member 10. A damping member 18 with a gear 181 is disposed on each of the two mounting slots 17. The gear 181 of the damping member 18 meshes with the curved rack 146 of the second slide 145 so that the respective second slide 145 is sliding stably while being moved with respect to the corresponding damping member 18, as shown in FIG. 5, FIG. 6, FIG. 11 and FIG. 12.

Refer to FIG. 3, FIG. 4, FIG. 9 and FIG. 10, the accessory 2 of the chair 3 is selected from the group consisting of an armrest 2a, a lumbar support 2b, a headrest 2c and a combination thereof.

Figure 7:
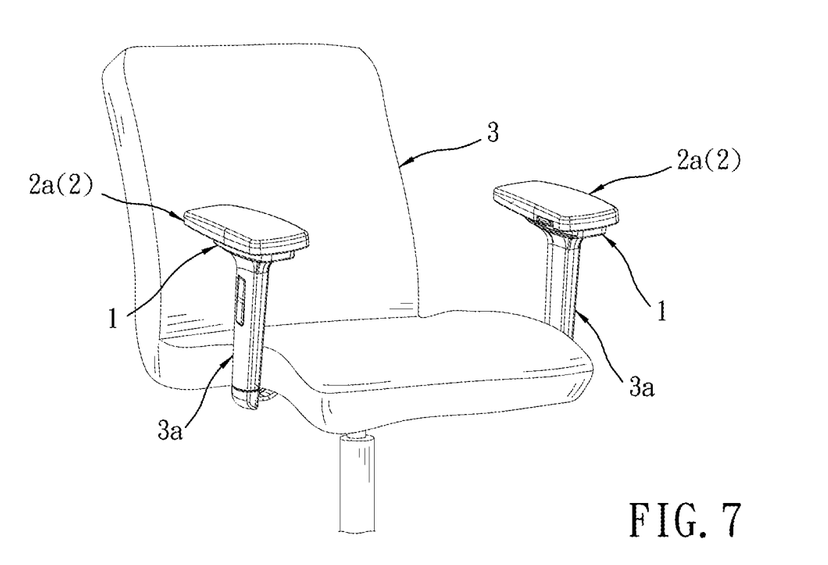
FIG. 7 is a schematic drawing showing an embodiment applied to armrests of a chair according to the present invention.
Figure 8:
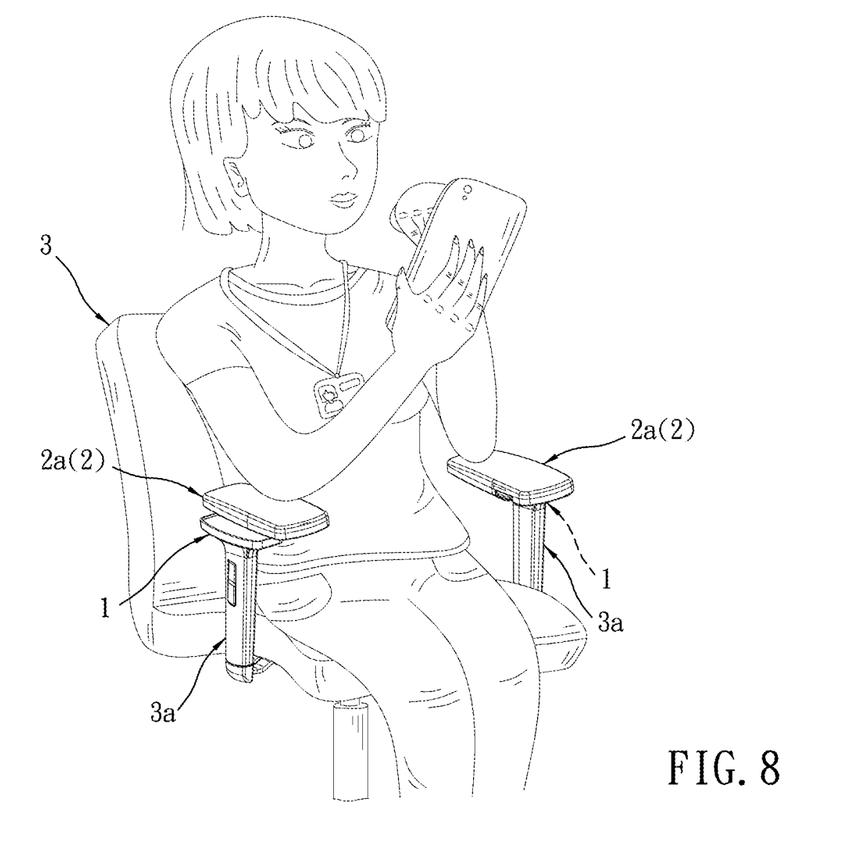
FIG. 8 is a schematic drawing showing the embodiment in FIG. 7 being moved inward further and used by a user according to the present invention.

Refer from FIG. 3 to FIG. 8, the displacement auxiliary device 1 is arranged at an armrest frame 3a of the chair 3 when the displacement auxiliary device 1 is applied to the armrest 2a. Refer to FIG. 7 and FIG. 8, the two displacement auxiliary devices 1 are disposed on the two armrest frames 3a of the chair 3 respectively. Besides the lateral direction, the longitudinal direction, and the direction of rotation (as the X axis, the Y axis and the Z axis in FIG. 4 indicate), the two armrests 2a can be moved further inward. The distance between the two armrests 2a is further reduced. Thus the user's elbows can lean on the two armrests 2a and operate the mobile phone more conveniently, as shown in FIG. 8.

Refer FIG. 9-12, the displacement auxiliary device 1 is arranged at a back 3b of the chair 3 by a medium member 40 when the displacement auxiliary device 1 is applied to the lumbar support 2b, as shown in FIG. 9. Thus the lumbar support 2b can be moved upward or downward further, as the arrow D in FIG. 10 indicates. Thus the position of the lumbar support 2b arranged at the back 3b of the chair 3 matches users' requirements exactly. The problem of the conventional lumbar support unable to match the user's lower back can be solved.

Refer to FIG. 9 and FIG. 10, when the displacement auxiliary device 1 is applied to the headrest 2c, the displacement auxiliary device 1 is disposed on the top of the back 3b of the chair 3. Thus the vertical movement of the headrest 2c can be increased, as the arrow E in FIG. 10 indicates. Thereby the height of the headrest 2c can be adjusted correspondingly to the user's head.

In summary, the displacement auxiliary device 1 according to the present invention has the following advantages compared with the conventional techniques in the field:

(1) The structure of the displacement auxiliary device 1 is simple and able to be modularized. Thus it can be applied to various chair accessories such as armrests, lumbar supports, headrests, etc. easily. Therefore production cost for the chair accessories can be reduced.

(2) The two rotating members 14 of the present invention are rotated a large angle around the rotary shafts 11 synchronously and symmetrically to be moved inward to the first position (as shown in FIG. 5) or extended outward to the second position (as shown in FIG. 6). Thus the accessory 2 can be moved and adjusted in a larger range between the first position and the second position and there is a larger displacement. Thereby the user can adjust the position of the accessory 2 more conveniently and easily while in use and the accessory 2 can be used more efficiently.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A displacement auxiliary device for accessories of a chair that is disposed on the chair and used in combination with at least one of the accessories of the chair comprising:
   a displacement member having a bottom plate, two laterally symmetrical rotary shafts fixed on the bottom plate, two laterally symmetrical fixing shafts fixed on the bottom plate, two laterally symmetrical fasteners, two laterally symmetrical rotating members that rotate synchronously, a stopping wall and two laterally symmetrical first locked parts;
   a fixing plate placed over the displacement member and provided with two laterally symmetrical indentations thereof, two laterally symmetrical first locking parts disposed on a bottom surface thereof and two laterally symmetrical second locking parts disposed on a bottom surface thereof; and
   a loading plate moveably arranged over the fixing plate and having two laterally symmetrical second locked parts and at least one accessory fixing part used for fixing the accessory thereon;

wherein each of the rotating members is provided a pivot hole, a penetrating slide slot, a curved first slide, and a curved toothed part; the pivot holes, the penetrating slide slots, the curved first slides, and the curved toothed parts are arranged symmetrically; the pivot hole is mounted on the rotary shaft correspondingly so that the rotating members can rotate around the rotary shafts respectively and toward each other; the fastener is inserted into the slide slot and sliding in the slide slot; the curved first slide is mounted on the fixing shaft to slide around the fixing shaft; the toothed parts of the rotating members mesh with each other so that the two rotating members can rotate around the rotary shafts synchronously and symmetrically to be moved inward to a first position or extended outward to a second position; the stopping wall is used for stopping the two rotating members at the first position;
   wherein the slide slots of the rotating members of the displacement member are protruding from the indentations of the fixing plate to be exposed; the first locking parts are locked into the rotary shafts of the displacement member and the second locking parts are mounted into the first locked parts of the displacement member so that the two fasteners and the two rotating members are movably held between the bottom plate and the fixing plate;
   wherein the two second locked parts are inserted into the two slide slots of the rotating members respectively to be connected to and fixed by the fastener in the slide slot; thereby the loading plate is moved outward synchronously to the second position or turned back synchronously to the first position along with the synchronous and symmetrical rotation of the two rotating members;
   wherein the bottom plate and the fixing plate stay still with respect to the chair when the accessory is fixed on the loading plate and the displacement auxiliary device is arranged at the chair in use; wherein the loading plate and the accessory remain still on the loading plate and there is no displacement when the two rotating members are rotated to be moved inward synchronously and symmetrically to the first position; wherein the loading plate and the accessory are moved outward to have displacement synchronously along with the synchronous and symmetrical rotation of the two rotating members when the rotating members are rotated to be extended outward synchronously and symmetrically to the second position.

2. The displacement auxiliary device as claimed in claim 1, wherein the displacement member is further provided with two laterally symmetrical mounting slots; a curved second slide having a curved rack is arranged at each of the rotating members and corresponding to the mounting slot.

3. The displacement auxiliary device as claimed in claim 2, wherein a damping member with a gear is disposed on each of the two mounting slots; the gear of the damping member meshes with the curved rack of the second slide so that the second slide is sliding stably while being moved with respect to the damping member correspondingly.

4. The displacement auxiliary device as claimed in claim 1, wherein the accessory of the chair is selected from the group consisting of an armrest, a lumbar support, a headrest and a combination thereof.

5. The displacement auxiliary device as claimed in claim 4, wherein the displacement auxiliary device is disposed on an armrest frame of the chair while being used in combination with the armrest.

6. The displacement auxiliary device as claimed in claim 4, wherein the displacement auxiliary device is arranged at a back of the chair by a medium member while being used in combination with the lumbar support.

7. The displacement auxiliary device as claimed in claim 4, wherein the displacement auxiliary device is mounted on the top of a back of the chair while being used in combination with the headrest.

* * * * *